US010533386B2

(12) United States Patent
Oddie et al.

(10) Patent No.: US 10,533,386 B2
(45) Date of Patent: Jan. 14, 2020

(54) DISCHARGE COEFFICIENT DETERMINATION OF A MANAGED PRESSURE DRILLING CHOKE/VALVE

(71) Applicant: SCHLUMBERGER TECHNOLOGY CORPORATION, Sugar Land, TX (US)

(72) Inventors: Gary Oddie, Cambridge (GB); Ashley Bernard Johnson, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 248 days.

(21) Appl. No.: 14/889,709

(22) PCT Filed: May 12, 2014

(86) PCT No.: PCT/US2014/037744
§ 371 (c)(1),
(2) Date: Nov. 6, 2015

(87) PCT Pub. No.: WO2014/183136
PCT Pub. Date: Nov. 13, 2014

(65) Prior Publication Data
US 2016/0076322 A1  Mar. 17, 2016

Related U.S. Application Data

(60) Provisional application No. 61/822,146, filed on May 10, 2013.

(51) Int. Cl.
E21B 21/08 (2006.01)
G01F 25/00 (2006.01)
E21B 21/10 (2006.01)

(52) U.S. Cl.
CPC .............. *E21B 21/08* (2013.01); *E21B 21/10* (2013.01); *G01F 25/0053* (2013.01); *G01F 25/0092* (2013.01)

(58) Field of Classification Search
CPC ... G01F 25/0053; G01F 25/0092; E21B 21/08
(Continued)

(56) References Cited

U.S. PATENT DOCUMENTS 4,836,032 A    6/1989  Redus et al.
5,107,441 A *  4/1992  Decker ................. E21B 43/123
                                                                137/155

(Continued)

FOREIGN PATENT DOCUMENTS

EP    1081472 A2    3/2001
WO    01/77485 A1   10/2001
(Continued)

OTHER PUBLICATIONS

Author: unknown, Title: MPD can control pressures, annulus returns, Date: Jul. 2004, Publication: Drilling Contractor, pp. 20-22.*
(Continued)

Primary Examiner — Harshad R Patel

(57) ABSTRACT

A method is provided for determining a discharge coefficient of a managed pressure drilling choke/valve as a function of valve opening position. The method comprises: a flow of air/gas through the choke/valve; measuring a velocity of the air/gas flow at an inlet of the choke/valve; and measuring a pressure drop of the air/gas flow across the choke/valve.

13 Claims, 3 Drawing Sheets

(58) Field of Classification Search
USPC .......................................... 73/152.36, 152.38
See application file for complete search history.

(56) References Cited

U.S. PATENT DOCUMENTS

| | | | |
|---|---|---|---|
| 5,226,728 A | 7/1993 | Vander Heyden | |
| 6,681,189 B1* | 1/2004 | Morrison et al. | G01F 1/36 702/100 |
| 2005/0284236 A1 | 12/2005 | Kielb et al. | |
| 2008/0011821 A1* | 1/2008 | Ellender et al. | G01F 1/42 235/375 |
| 2012/0086580 A1* | 4/2012 | Ocondi et al. | G01V 11/002 340/854.6 |

FOREIGN PATENT DOCUMENTS

| | | |
|---|---|---|
| WO | 2013/005091 A2 | 1/2013 |
| WO | 2013/006090 A1 | 1/2013 |

OTHER PUBLICATIONS

Author: unknown, Title: American National Standard—ANSI/ISA-75.02-1996, Control Valve Capacity Test Procedures, Date: 1996, Publisher: Instrument Society of America, total pp. 28.*
Hubert, D. et al., "Analysis of Flow Behaviour and Characteristics of Pneumatic Components", Proceedings of the JFPS International Symposium on Fluid Power, 2008, 2008(7-3), pp. 719-724.
Search Report and Written Opinion of International Patent Application No. PCT/US2014/037744 dated Sep. 12, 2014, 14 pages.
International Preliminary Report on Patentability of International Patent Application No. PCT/US2014/037744 dated Nov. 19, 2015, 10 pages.
Communication pursuant to Article 94(3) EPC of European Patent Application No. 14794648.7 dated Jul. 4, 2016, 6 pages.
Supplementary European Search Report of European Patent Application No. 14794648.7 dated Jun. 13, 2016, 3 pages.
Miller, D.S., "Internal Flow Systems", BHRG, 2nd Reprint, 1985, Chapter 14, pp. 260-281.

* cited by examiner

DISCHARGE COEFFICIENT DETERMINATION OF A MANAGED PRESSURE DRILLING CHOKE/VALVE

BACKGROUND

Embodiments of the present invention relate to the determination of a discharge coefficient of a managed pressure drilling choke/valve as a function of valve opening position.

In the hydrocarbon industry, boreholes/wellbores are drilled into subterranean hydrocarbon reservoirs so that the hydrocarbons can be recovered. The drilling of a borehole is typically carried out using a steel pipe known as a drillstring with a drill bit on the lowermost end; the drill bit is normally attached to or is a part of a bottomhole assembly attached to the lower end of the drillstring. In a drilling procedure, the entire drillstring may be rotated using an over-ground drilling motor, or the drill bit may be rotated independently of the drillstring using a fluid powered motor or motors mounted in the drillstring just above the drill bit. As drilling progresses, a flow of drilling fluid is used to carry the debris created by the drilling process out of the wellbore. During the drilling procedure, the drilling fluid is pumped through an inlet line down the drillstring, passes through holes in the drill bit, and returns to the surface via an annular space between the outer diameter of the drillstring and the borehole (the annular space is generally referred to as the annulus).

Drilling fluid is a broad drilling term that may cover various different types of drilling fluids. The term "drilling fluid" may be used to describe any fluid or fluid mixture used during drilling and may cover such things as drilling mud, heavily weighted mixtures of oil or water with solid particles, air, nitrogen, misted fluids in air or nitrogen, foamed fluids with air or nitrogen, and aerated or nitrified fluids.

In practice, the flow of drilling fluid through the drillstring may be used to cool the drill bit as well as to remove the cuttings from the bottom of the borehole. In conventional overbalanced drilling, the density of the drilling fluid is selected so that it produces a pressure at the bottom of the borehole (the "bottom hole pressure" or "BHP"), which is high enough to counter-balance the pressure of fluids in the formation ("the formation pore pressure"). By counter-balancing the pore pressure, the BHP acts to prevent the inflow of fluids from the formations surrounding the borehole into the borehole. However, if the BHP falls below the formation pore pressure, formation fluids, such as gas, oil and/or water may enter the borehole and produce what is known in drilling as a kick. By contrast, if the BHP is high, the BHP may be higher than the fracture strength of the formation surrounding the borehole resulting in fracturing of the formation. When the formation is fractured, the drilling fluid may enter the formation and be lost from the drilling process. This loss of drilling fluid from the drilling process may cause a reduction in BHP and as a consequence cause a kick as the BHP falls below the formation pore pressure. Loss of fluid to the formations as a result of fracturing is known as fluid loss or lost circulation and may be expensive, as a result of lost drilling fluid, and increase the time to drill the borehole. Kicks are also dangerous and the liquid and/or gas surge associated with the influx into the borehole requires handling at surface.

In order to overcome the problems of kicks and/or fracturing of the formation during drilling, a process known as managed pressure drilling ("MPD") has been developed. In managed pressure drilling various techniques are used to control/manage the BHP during the drilling process. In MPD, the flow of drilling fluid into and out of the borehole is controlled. This means that pumps that pump the fluid into the borehole and chokes that control the flow of fluid out of the borehole are controlled to control the BHP. Additionally, gas may be injected into the drilling fluid to reduce the drilling fluid density and thus reduce the BHP produced by the column of the drilling fluid in the drilling annulus. In general, until recently, MPD techniques have been fairly crude, relying on manual control of the pumps and choke.

In MPD, the annulus may be closed using a pressure containment device. This device comprises sealing elements, which engage with the outside surface of the drillstring so that flow of fluid between the sealing elements and the drillstring is substantially prevented. The sealing elements may allow for rotation of the drillstring in the borehole so that the drill bit on the lower end of the drillstring may be rotated. A flow control device may be used to provide a flow path for the escape of drilling fluid from the annulus. After the flow control device, a pressure control manifold with at least one adjustable choke or valve may be used to control the rate of flow of drilling fluid out of the annulus. When partially closed during drilling, the pressure containment device creates a backpressure in the wellbore, and this back pressure can be controlled by using the adjustable choke or valve on the pressure control manifold to control the degree to which flow of drilling fluid out of the annulus/riser annulus is restricted.

During MPD an operator may monitor and compare the flow rate of drilling fluid into the drillstring with the flow rate of drilling fluid out of the annulus to detect if there has been a kick or if drilling fluid is being lost to the formation. A sudden increase in the volume or volume flow rate out of the annulus relative to the volume or volume flow rate into the drillstring may indicate that there has been a kick. By contrast, a sudden drop in the flow rate out of the annulus/ relative to the flow rate into the drillstring may indicate that the drilling fluid has penetrated the formation.

In some MPD procedures, gas may be pumped into the annulus between the drillstring and the borehole wall in order to reduce bottomhole-pressure while drilling. Often, the borehole is lined with a pipe referred to as a casing string that may be cemented to the borehole wall to, among other things, stabilize the borehole and allow for flow of drilling fluids, production of hydrocarbons from the borehole and/or the like. In such aspects, a drilling annulus may be formed by the annulus lying between the drillstring and the casing string.

Annular gas injection is an MPD process for reducing the bottomhole-pressure in a well/borehole. In many annular gas injection systems, in addition to casing in the well, the casing being a tubing that lines the borehole and may in some cases be cemented to the wall of the borehole, there is a secondary annulus. This secondary annulus may be connected by one or more orifices at one or more depths to the primary annulus, through which the drilling fluids flow.

FIG. 1 illustrates a managed pressure drilling system. As depicted, a drillstring 1 is suspended in a wellbore 4 (for purposes of this application the terms wellbore, borehole and well may be used interchangeable). In the upper section of the wellbore 4 there is an inner annulus 2 (also referred to as a drilling annulus) and a first casing string 11 that is hydraulically connected/in fluid communication with an outer annulus 9 through one or more orifices 3. The outer annulus 9 may itself be cased/lined by a second casing string 12.

The depicted concentric casing injection system may be used to inject gas into the wellbore 4 that is being drilled through a subterranean formation. The concentric casing injection system comprises the outer annulus 9, which may also be referred to as a gas injection annulus, that surrounds the inner annulus 2, which may also be referred to as a drilling annulus, which drilling annulus is formed between the drillstring 1 disposed in the borehole and the first casing string 11 lining the borehole.

The gas injection annulus comprises an annulus between the first casing string 11 the second casing string 12, which may be disposed concentrically around or in a different configuration with respect to the first casing string 11. In one embodiment, gas is pumped into outer annulus 9 and through one or more gas injection ports 3 into the inner annulus 2. During, gas injection procedures, the concentric casing injection system may become/be unstable because of among other things the combination of the large volume and compliance of the gas in the outer annulus 9 along with the history dependent hydrostatic head of the inner annulus 2.

During a MPD procedure, drilling fluid (also referred to herein as drilling mud or mud) may be pumped from a pump(s) (not shown) through pipework 8 into the drillstring 1, down which it passes until it exits at a distal end 5, through a drill bit (not shown) or the like, before returning via the inner annulus 2 and return pipework 7 to fluid tanks for handling/preparing the drilling fluid. Between the pipework 7 and the fluid tanks (not shown) there may be chokes 13 and separators (not shown).

The outer annulus 9 and the pipes feeding the top of the drillstring are connected to gas pumps 15, via a valve manifold 10, which may direct gas either to the drillstring feed, to the outer annulus 9 or optionally to both at once. In the MPD procedure, pressure measurements may be made in the outer annulus 9, the inner annulus 2, the drillstring 1, and/or the like (e.g., at pressure transducer 6). In addition to the described equipment, there may be many other pieces of equipment at the surface, such as blow-out-preventers, a rotating-control-head, etc., which are normal with managed-pressure drilling.

In a gas injection MPD system, the one or more flow ports 3 between the outer annulus 9 and the inner annulus 2 may allow drilling mud to flow between the inner annulus 2 and the outer annulus 9. For example, during the drilling process mud may be flowing in the inner annulus 2 and may flow through the one or more flow ports 3 into the outer annulus 9.

Previously, in a MPD procedure, pumps and an outflow valve/choke have been controlled to manage the BHP. Generally, the amount of fluid being pumped into the wellbore has been measured/estimated and the amount of fluid flowing out of the borehole, has been measured/estimated and the pumps/valves/chokes have been adjusted to change the inflow and outflow to maintain the BHP within prescribed limits, or to react to unexpected phenomena in the pressure and/or flowrate.

To better control the outflow and/or to automate the MPD operation, characterization of the choke is necessary so that a choke position can be selected to produce the desired outflow from the borehole. However, characterizing the operation of a MPD drilling choke has previously required flowing the liquid to be used in the MPD operation, a drilling fluid, through the choke, which may be either costly or impracticable with respect to chokes that are deployed in the field. For example, at the time of manufacture the choke may be characterized by flowing drilling fluids through the choke to characterize its operation. In the field, the choke may be taken offline and characterized by flowing drilling fluids through the choke to determine how it operates. Both of these processes are expensive and the in-field characterization may not be practicable.

SUMMARY

In order to determine the discharge coefficient of a flow controlling valve, it is necessary to measure the pressure drop across the valve as a function of flow rate using fluids of known properties. This calibration procedure would usually involve a dedicated facility and the calibration process would use the same fluid as the valve/choke might control in the final application e.g. a water calibration for a water application. However, the present inventors have found that a different fluid may be used for the calibration, producing results that can be used for operation of the flow control valve in a MPD procedure. In this way, the present invention enables cleaner, simpler and quicker determination of the discharge coefficient of the MPD flow control valve. Given the properties of drilling fluids, which, in general, comprise complex mixtures that provide a range of physical properties, it is somewhat surprising that alternative fluids may be used to characterize the discharge coefficient of MPD flow control valves, and it is even more unexpected that such flow control valves may be characterized using a gas.

Thus in a first aspect, the present invention provides a method for determining a discharge coefficient of a managed pressure drilling choke/valve as a function of valve opening position, comprising:

passing a flow of air/gas through the choke/valve;
measuring a velocity of the air/gas flow at an inlet of the choke/valve; and
measuring a pressure drop of the air/gas flow across the choke/valve.

The method may have any one or any combination of the following optional features.

The method may further comprise: determining the discharge coefficient of the choke/valve as a function of valve opening position from the measured pressure drop, the measured velocity and a density of the air/gas.

The pressure drop measurement may be repeated for different valve opening positions and/or different air/gas flow rates.

The velocity measurement may be repeated for different valve opening positions and/or different air/gas flow rates.

The method may further comprise: determining the valve opening position.

The pressure drop across the choke/valve may be controlled so as to avoid compressibility effects in the air/gas flow at least in the region of the flow over which the pressure drop measurement is made. This region will include the choke/valve. Making the velocity measurement downstream of the pressure drop measurement can reduce compressibility effects in the pressure drop measurement.

For example, the pressure drop across the choke/valve may be less than 25%, and preferably less than 20% or 15%, of the absolute pressure at the inlet of the choke/valve.

The Mach number of the air/gas flow may be less than 0.2, and preferably less than 0.1 so that thermal and compressibility effects in the flow are small.

In a second aspect, the present invention provides a system for determining a discharge coefficient of a managed pressure drilling choke/valve as a function of valve opening position, comprising:

a source of an air/gas flow for passing through the choke/valve;

a differential pressure measurement arrangement for measuring the pressure drop of the air/gas flow across the choke/valve; and a device for measuring a velocity of the air/gas flow at an inlet of the choke/valve.

The system may have any one or any combination of the following optional features.

For example, the differential pressure measurement arrangement may comprise a first pressure transducer for measuring a first pressure of the air/gas flow upstream of the choke/valve and a second pressure transducer for measuring a second pressure of the air/gas flow downstream of the choke/valve.

The system may further comprise: a processor configured to determine the discharge coefficient of the choke/valve as a function of valve opening position from the measured differential pressure, the measured velocity and a density of the air/gas. The pressure drop measurement may be repeated for different valve opening positions and/or different air/gas flow rates. The velocity measurement may be repeated for different valve opening positions and/or different air/gas flow rates.

The device for measuring the velocity of the air/gas flow at the inlet of the managed pressure drilling choke/valve may comprise a flowmeter disposed either upstream or, more preferably, downstream of the choke/valve.

The source of the air/gas flow may comprise a compressor, a fan or a blower.

The source of the air/gas flow may comprise a fan with a power of 1-2 kW.

The system may further comprise: a controller for controlling a flow rate of the air/gas flow. For example, the controller may control the flow rate (e.g. via a vent line) so that the pressure drop across the choke/valve is less than 25%, and preferably less than 20% or 15%, of the absolute pressure at the inlet of the choke/valve. Alternatively or additionally, the controller may control the flow rate so that the Mach number of the air/gas flow is less than 0.2, and preferably less than 0.1.

The system may further comprise: a device, such as a transducer, for determining the valve opening position.

BRIEF DESCRIPTION OF THE DRAWINGS

Embodiments of the invention will now be described by way of example with reference to the accompanying drawings in which.

DETAILED DESCRIPTION

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well known methods, procedures, components, and systems have not been described in detail so as not to unnecessarily obscure aspects of the embodiments. In the following description, it should be understood that aspects of one embodiments may be used in combination with aspects from another embodiment where the combination of the aspects provides for determining a valve discharge coefficient and the aspects of the different embodiment are not incompatible.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
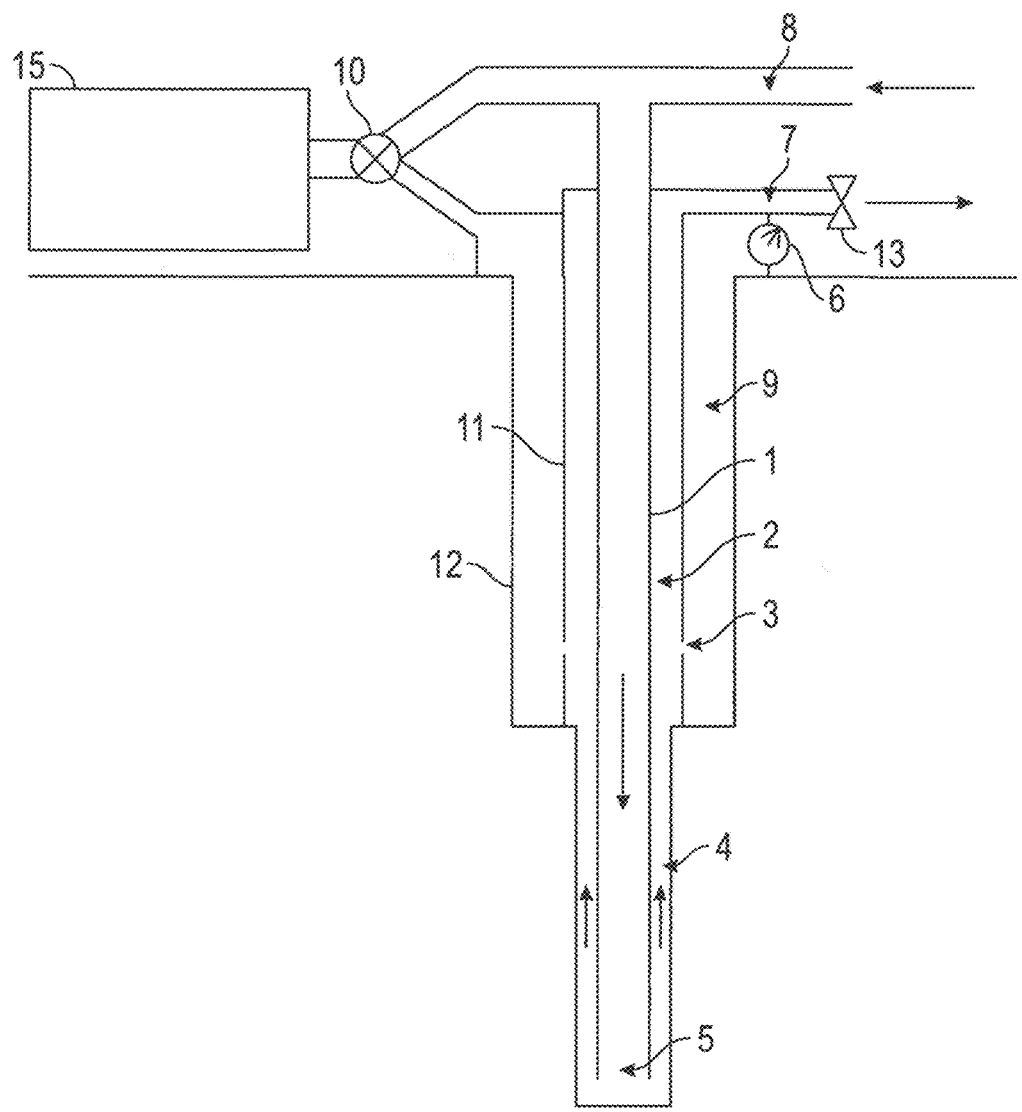
FIG. 1 illustrates a managed pressure drilling system.
Figure 2:
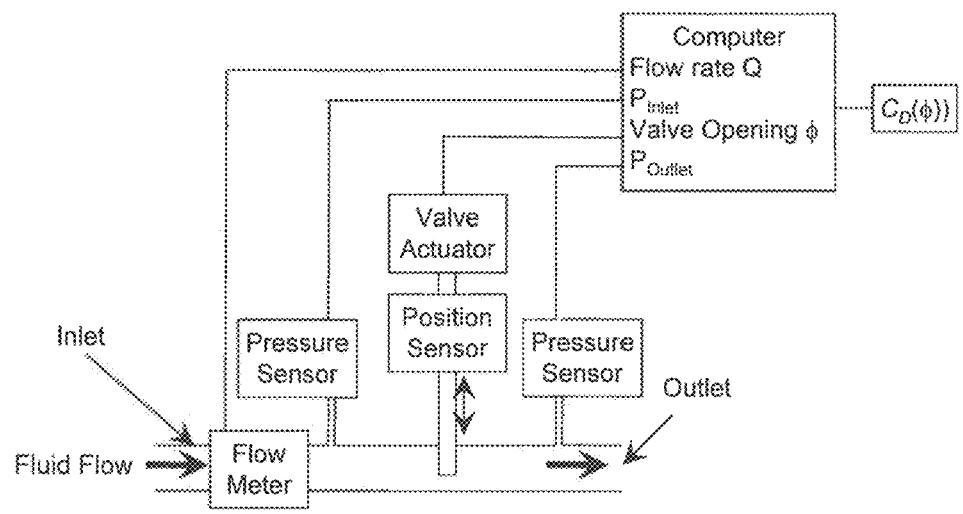
FIG. 2 shows a calibration system for determining the discharge coefficient of a flow rate controlling valve.

A usual method to determine the discharge coefficient of a flow rate controlling valve is to calibrate the valve in a test facility using the same fluid as the valve will see in service. A diagram of such a calibration system is shown in FIG. 2. The method is identical to calibrating a differential pressure flow meter, i.e. measure the differential pressure across the device as a function of the flow rate and determine the discharge coefficient $C_D$ using the following equation:

$$C_D = \frac{\Delta P}{\frac{1}{2}\rho U^2}$$

where:

$\Delta P$ is the pressure drop, measured with a differential pressure transducer or (as shown) the difference of two absolute pressure measurements;

$\rho$ is the density of the fluid at the inlet of the valve; and

Figure 3:
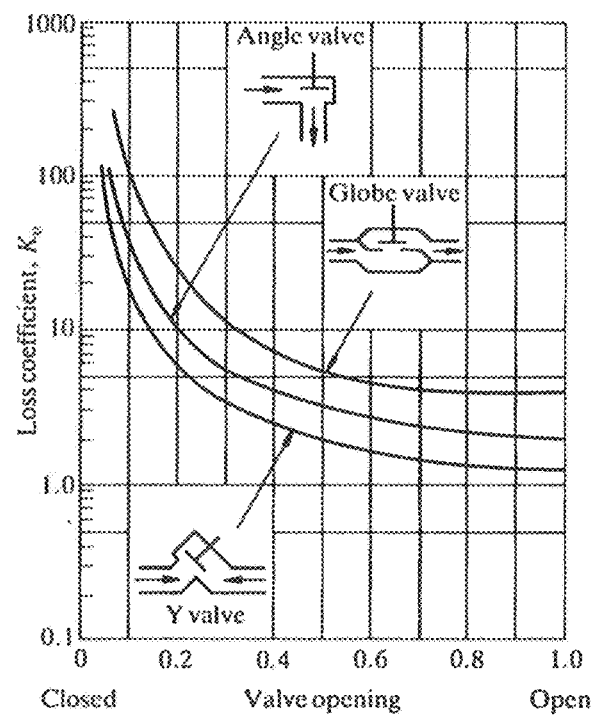
FIG. 3 shows a graph of loss coefficient $K_v$ (equal to discharge coefficient $C_D$) against valve position $\varphi$ for a number of valve types.

U is the velocity of the fluid at the inlet of the valve. The velocity may be measured either directly using a velocity sensor, or calculated from a flowmeter reading and a known inlet cross sectional area. The value of the discharge coefficient is determined for several values of valve position φ, and is usually presented in a graphical form as shown in FIG. 3.

In MPD, the pressure and flow rate of the fluid flow returning from the annulus is controlled by a hydraulically actuated valve. In order to directly control the flow, i.e., without reactively adjusting the valve in response to outflow measurements made after the position of the valve is changed, the discharge coefficient of the valve must be known as a function of the valve position. Determining the discharge coefficient in the field using the installed hardware (treating iron, triplex pump etc.), the drilling fluids (drilling mud) and available instrumentation (rugged pressure transducers and flowmeters of questionable performance in pulsatile flow) is challenging.

Accordingly, in the present invention, air/gas is used as the fluid with which the MPD valve/choke is characterized. In such embodiments, a simple air or gas supply (bottled gas, compressor and/or a fan/blower), a flowmeter (rotameter, portable hotwire or the like) and a pressure transducer(s) may be used to determine the discharge coefficient of the valve as a function of valve opening position. In particular, the air/gas may be used to determine the discharge coefficient of the valve as a function of valve opening position where a Reynolds number similarity is maintained between the gas/air and the drilling fluid to be used in the MPD and/or a Mach number with respect to the flowing air/gas is small (<0.1), so that thermal and compressibility effects are small.

Figure 4:
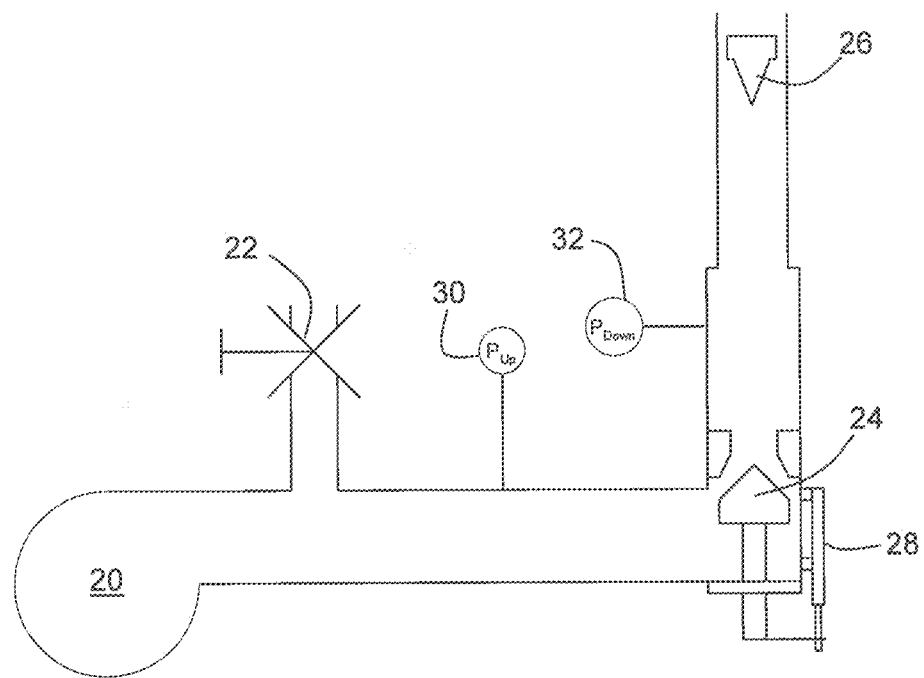
FIG. 4 shows a system for using air/gas to determine the discharge coefficient of a choke/valve as a function of valve opening position.

A system for using air/gas to determine the discharge coefficient of the valve as a function of valve opening position is shown in FIG. 4. The system has an air/gas supply (fan, blower and/or the like) 20, a vent line 22 to give control of the flow rate, a choke/valve 24 under test, a flowmeter 26 for measuring the velocity of the air/gas flow at the inlet of the choke/valve, a linear variable displacement transducer 28 for determining the choke/valve opening position, and first 30 and second 32 pressure transducers form measuring the pressure drop of the air/gas flow across the choke/valve.

It may be important that when using air (or another gas) as the calibration fluid, the maximum pressure drop across the system should not introduce compressibility effects. Thus, the pressure drop (differential pressure over absolute pressure) across the choke/valve may be limited to less than about 15-25%. The flowmeter may be located downstream of the test choke so as to avoid any pressure drop effects produced by the flow meter from impacting on the choke/valve.

To show the benefits of the present invention, examples of a valve calibration for both air and water are provided in Tables 1 and 2 below. The power shown is the hydraulic power dissipated by the choke, and is representative of the pumping power required for the system. The Table 1 shows data for a valve being calibrated using gas and Table 2 shows the valve being calibrated using water. In each table, the first discharge coefficient $C_D$ of 20 corresponds to a 5% valve closing position, and each subsequent $C_D$ value corresponds to 10% further closure. Thus the last discharge coefficient $C_D$ of 10240 corresponds to a 95% valve closing position.

TABLE 1

| $C_D$ | $V^2$ $m^2/s^2$ | V m/s | Q $m^3/s$ | Flow Scfm | $Sm^3/h$ | Re | Pressure psi | kPa | Power kW |
|---|---|---|---|---|---|---|---|---|---|
| 20 | 510.20 | 22.59 | 0.183 | 388.02 | 659.25 | 1.57E+05 | 1 | 6.9 | 1.221 |
| 40 | 255.10 | 15.97 | 0.129 | 274.37 | 466.16 | 1.11E+05 | 1 | 6.9 | 0.863 |
| 80 | 127.55 | 11.29 | 0.092 | 194.01 | 329.63 | 7.86E+04 | 1 | 6.9 | 0.610 |
| 160 | 63.78 | 7.99 | 0.065 | 137.19 | 233.08 | 5.56E+04 | 1 | 6.9 | 0.432 |
| 320 | 31.89 | 5.65 | 0.046 | 97.01 | 164.81 | 3.93E+04 | 1 | 6.9 | 0.305 |
| 640 | 15.94 | 3.99 | 0.032 | 68.59 | 116.54 | 2.78E+04 | 1 | 6.9 | 0.216 |
| 1280 | 7.97 | 2.82 | 0.023 | 48.50 | 82.41 | 1.96E+04 | 1 | 6.9 | 0.153 |
| 2560 | 3.99 | 2.00 | 0.016 | 34.30 | 58.27 | 1.39E+04 | 1 | 6.9 | 0.108 |
| 5120 | 1.99 | 1.41 | 0.011 | 24.25 | 41.20 | 9.82E+03 | 1 | 6.9 | 0.076 |
| 10240 | 1.00 | 1.00 | 0.008 | 17.15 | 29.14 | 6.95E+03 | 1 | 6.9 | 0.054 |

TABLE 2

| $C_D$ | $V^2$ $m^2/s^2$ | V m/s | Q $m^3/s$ | Flow gpm | bpm | l/s | Re | Pressure psi | kPa | Power kW |
|---|---|---|---|---|---|---|---|---|---|---|
| 20 | 68.03 | 8.25 | 0.067 | 1080.18 | 25.72 | 68.2 | 8.38E+05 | 100 | 690 | 45.488 |
| 40 | 34.01 | 5.83 | 0.047 | 763.80 | 18.19 | 48.2 | 5.93E+05 | 100 | 690 | 32.165 |
| 80 | 17.01 | 4.12 | 0.033 | 540.09 | 12.86 | 34.1 | 4.19E+05 | 100 | 690 | 22.744 |
| 160 | 8.50 | 2.92 | 0.024 | 381.90 | 9.09 | 24.1 | 2.96E+05 | 100 | 690 | 16.083 |
| 320 | 4.25 | 2.06 | 0.017 | 270.04 | 6.43 | 17.0 | 2.09E+05 | 100 | 690 | 11.372 |
| 640 | 10.63 | 3.26 | 0.026 | 426.98 | 10.17 | 27.0 | 3.31E+05 | 500 | 3450 | 89.904 |
| 1280 | 5.31 | 2.31 | 0.019 | 301.92 | 7.19 | 19.1 | 2.34E+05 | 500 | 3450 | 63.572 |
| 2560 | 2.66 | 1.63 | 0.013 | 213.49 | 5.08 | 13.4 | 1.66E+05 | 500 | 3450 | 44.952 |
| 5120 | 1.33 | 1.15 | 0.009 | 150.96 | 3.59 | 9.51 | 1.17E+05 | 500 | 3450 | 31.786 |
| 10240 | 0.66 | 0.82 | 0.007 | 106.74 | 2.54 | 6.73 | 8.28E+04 | 500 | 3450 | 22.476 |

From the data, it can be seen that for calibration of a MPD type choke/valve with water, the power requirements are large and would require the use of a rig pump in the field and a fairly large pump in a test center. However, by using air/gas as the calibration medium, a small portable fan with power of the order of 1-2 kW is sufficient for calibration of the MPD choke/valve. In fact, commercially available sources such as a commercial fan, a leaf blower and/or the like may be used for the air/gas source.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

NUMBERED CLAUSES RELATING TO THE INVENTION

[Clause 1] A method for determining a discharge coefficient of a managed pressure drilling choke/valve as a function of valve opening position according to any of the methods described herein.

[Clause 2] A system for determining a discharge coefficient of a managed pressure drilling choke/valve as a function of valve opening position according any of the systems described herein.

[Clause 3] A method for determining a discharge coefficient of a managed pressure drilling choke/valve as a function of valve opening position, comprising:
  passing a flow of air/gas through the choke/valve;
  measuring a velocity of the air/gas at an inlet of the valve; and
  measuring a pressure drop of the flow of the air/gas across the choke/valve.

[Clause 4] The method of Clause 3, wherein measuring a velocity of the air/gas at an inlet of the valve comprises measuring a flow rate of the air/gas either upstream or downstream of the choke/valve.

[Clause 5] The method of Clause 3, wherein a similarity of a Reynolds number of the gas/air and the drilling fluid to be used in the MPD is maintained during the discharge coefficient determination process.

[Clause 6] The method of Clause 3, wherein a maximum pressure drop (differential pressure over absolute pressure) across the system is controlled so as not introduce compressibility effects.

[Clause 7] The method of Clause 3, wherein a pressure drop (differential pressure over absolute pressure) may be limited to less than about 15-25%.

[Clause 8] A system for determining a discharge coefficient of a managed pressure drilling choke/valve as a function of valve opening position, comprising:
  a source of an air/gas flow;
  a first pressure transducer for measuring a first pressure of the air/gas flow upstream of the managed pressure drilling choke/valve;
  a second pressure transducer for measuring a first pressure of the air/gas flow downstream of the managed pressure drilling choke/valve; and
  a device for measuring a velocity or flow rate of the air/gas flow at an inlet of the managed pressure drilling choke/valve.

[Clause 9] The system of Clause 8, further comprising:
  a processor configured to determine the discharge coefficient of a managed pressure drilling choke/valve as a function of valve opening position from at least one of the first pressure, the second pressure, the velocity/flowrate and a density of the air/gas.

[Clause 10] The system of Clause 8, wherein the device for measuring the velocity of the air/gas flow at the inlet of the managed pressure drilling choke/valve comprises a flowmeter disposed either upstream or downstream of the managed pressure drilling choke/valve.

[Clause 11] The system of Clause 8, wherein the source of the air/gas flow comprises at least one of a compressor, a fan and a blower.

[Clause 12] The system of Clause 8, wherein the source of the air/gas flow comprises a fan with a power of the order of 1-2 kilo Watts.

[Clause 13] The system of Clause 8, wherein the first and the second pressure transducers comprise a differential pressure transducer.

[Clause 14] The system of Clause 8, further comprising:
  a controller for controlling a flow rate of the flow of the air/gas.

The invention claimed is:

1. A method for calibrating a managed pressure drilling choke or valve as a function of choke or valve opening position by determining a discharge coefficient of the choke or valve, comprising:
  passing a flow of gas through the choke or valve;
  measuring a velocity of the gas flow downstream of the choke or valve;
  measuring a pressure drop of the gas flow across the choke or valve; and
  determining the discharge coefficient of the choke valve, which includes maintaining a similarity of a Reynolds number of the gas flow and a Reynolds number of a drilling fluid flow to be used in the managed pressure drilling while passing the flow of gas through the choke or valve and while measuring the pressure drop of the gas flow across the choke or valve.

2. The method of claim 1, further comprising measuring a flow rate of the gas downstream of the choke or valve.

3. The method of claim 1, wherein the pressure drop across the choke or valve is controlled so as to reduce compressibility effects in the gas flow at least in the region of the flow over which the pressure drop measurement is made.

4. The method of claim 3, wherein the pressure drop across the choke or valve is less than 25% of the absolute pressure at the inlet of the choke or valve.

5. The method of claim 3, wherein the Mach number of the gas flow is less than 0.2.

6. A system for calibrating a managed pressure drilling choke or valve as a function of choke or valve opening position by determining a discharge coefficient, comprising:
  a source of a gas flow for passing through the choke or valve, where the source of the gas flow is provided with a power in a range of about 1 to 2 kW, wherein the source of the gas flow comprises a compressor, a fan, or a blower;
  a differential pressure measurement arrangement for measuring the pressure drop of the gas flow across the choke or valve;
  a device for measuring a velocity of the gas flow downstream of the choke or valve; and a processor configured to determine the discharge coefficient using input from the differential pressure measurement arrangement and the device for measuring the velocity of the gas flow.

7. The system of claim 6, wherein the differential pressure measurement arrangement comprises a first pressure transducer for measuring a first pressure of the gas flow upstream of the choke or valve and a second pressure transducer for measuring a second pressure of the gas flow downstream of the choke or valve.

8. The system of claim 6, wherein the device for measuring the velocity of the gas flow downstream of the managed pressure drilling choke or valve comprises a flowmeter disposed downstream of the choke or valve.

9. A method for determining a discharge coefficient of a managed pressure drilling choke or valve as a function of choke or valve opening position, comprising:
  passing a flow of gas through the choke or valve, the gas flow having a Mach number less than 0.2;
  measuring a velocity of the gas flow downstream of the choke or valve;
  measuring a pressure drop of the gas flow across the choke or valve; and
  determining the discharge coefficient of the choke or valve using the measured velocity and pressure drop of the gas flow.

10. The method of claim 9, further comprising measuring the gas flow rate downstream of the choke or valve.

11. The method of claim 9, wherein a similarity of a Reynolds number of the gas flow and a Reynolds number of the drilling fluid flow to be used in the managed pressure drilling is maintained during the discharge coefficient determination.

12. The method of claim 9, wherein the pressure drop across the choke or valve is controlled so as to reduce compressibility effects in the gas flow at least in the region of the flow over which the pressure drop measurement is made.

13. The method of claim 12, wherein the pressure drop across the choke or valve is less than 25% of the absolute pressure at the inlet of the choke or valve.

* * * * *